US007953440B2

(12) United States Patent
Nagata et al.

(10) Patent No.: US 7,953,440 B2
(45) Date of Patent: May 31, 2011

(54) MOBILE DEVICE SYSTEM AND MOBILE DEVICE

(75) Inventors: Hideki Nagata, Hachioji (JP); Hiroyuki Minakata, Hachioji (JP); Takayuki Ide, Fussa (JP); Atsushi Kohashi, Akiruno (JP); Minoru Omaki, Kunitachi (JP)

(73) Assignee: Olympus Corporation, Tokyo (JP)

( * ) Notice: Subject to any disclaimer, the term of this patent is extended or adjusted under 35 U.S.C. 154(b) by 812 days.

(21) Appl. No.: 11/903,893

(22) Filed: Sep. 24, 2007

(65) Prior Publication Data
US 2008/0081619 A1    Apr. 3, 2008

(30) Foreign Application Priority Data

Sep. 28, 2006  (JP) ................................. 2006-264751

(51) Int. Cl.
*H04B 1/38* (2006.01)
(52) U.S. Cl. .................. 455/557; 455/556.1; 455/556.2
(58) Field of Classification Search .................. 455/557, 455/412.1, 414.1, 552.1, 553.1, 556.2, 566
See application file for complete search history.

(56) References Cited

U.S. PATENT DOCUMENTS

| 5,327,144 | A  | * | 7/1994  | Stilp et al. ..................... 342/387 |
| 6,732,144 | B1 | * | 5/2004  | Kizu et al. ..................... 709/203 |
| 2004/0148404 | A1 | * | 7/2004  | Muroya et al. ................. 709/228 |
| 2005/0271072 | A1 | * | 12/2005 | Anderson et al. ............. 370/419 |
| 2006/0167997 | A1 | * | 7/2006  | Forstadius ..................... 709/204 |
| 2007/0147867 | A1 | * | 6/2007  | Sekiya ............................ 399/75 |
| 2008/0125101 | A1 | * | 5/2008  | Bakos et al. .................. 455/418 |

FOREIGN PATENT DOCUMENTS

JP          2002-9879         1/2002

* cited by examiner

*Primary Examiner* — Jean A Gelin
(74) *Attorney, Agent, or Firm* — Kenyon & Kenyon LLP

(57) ABSTRACT

A plurality of mobile devices interoperate without configuration operation. A mobile device system including a plurality of mobile devices is provided. Each mobile device is operable in one of an independent-operation mode in which the mobile device operates with priority over the other mobile devices and a dependent mode in which the mobile device operates dependently on another mobile device and includes a control unit having a start-up-order detection unit configured to detect the start-up order of the mobile device with respect to the other mobile devices. A first mobile device operates in the independent-operation mode when the start-up order of the first mobile device detected by the start-up-order detection unit is earlier than the start-up order of a second mobile device and operates in the dependent-operation mode when the start-up order is later than the start-up order of the second mobile device.

4 Claims, 7 Drawing Sheets

| IDENTIFICATION INFORMATION | DEVICE | IP ADDRESS |
|---|---|---|
| 0004 | PORTABLE DISPLAY DEVICE | **** |
| 0005 | PDA | **** |
| 0006 | DIGITAL CAMERA | **** |

US 7,953,440 B2

MOBILE DEVICE SYSTEM AND MOBILE DEVICE

BACKGROUND OF THE INVENTION

1. Field of the Invention

The present invention relates to a mobile communication system capable of operating a plurality of mobile devices interoperatively and a mobile device.

This application is based on Japanese Patent Application No. 2006-264751, the content of which is incorporated herein by reference.

2. Description of Related Art

Recently, due to the diversification of information, in many cases, people carry multiple mobile devices having various functions, such as mobile phones, laptop computers, information communication terminals, digital cameras, and music players, when going out (see Japanese Unexamined Patent Application, Publication No. 2002-9879).

For example, Japanese Unexamined Patent Application, Publication No. 2002-9879 discloses a system for combining a plurality of mobile devices by sending image data captured by a digital camera to a mobile phone via a local network and further sending the image data to an external network using the mobile phone.

BRIEF SUMMARY OF THE INVENTION

A first aspect is a mobile device system including a plurality of mobile devices, wherein each mobile device is operable in one of an independent-operation mode in which the mobile device operates with priority over the other mobile devices and a dependent mode in which the mobile device operates dependently on another mobile device and includes a start-up-order detection unit configured to detect the start-up order of the mobile device with respect to the other mobile devices, and wherein a first mobile device operates in the independent-operation mode when the start-up order of the first mobile device detected by the start-up-order detection unit is earlier than the start-up order of a second mobile device and operates in the dependent-operation mode when the start-up order is later than the start-up order of the second mobile device.

A second aspect is a mobile device including a start-up-order detection unit configured to detect the start-up order of the mobile device with respect to the other mobile devices, wherein each mobile device is operable in one of an independent-operation mode in which the mobile device operates with priority over the other mobile devices and a dependent mode in which the mobile device operates dependently on another mobile device, and wherein a first mobile device operates in the independent-operation mode when the start-up order of the first mobile device detected by the start-up-order detection unit is earlier than the start-up order of a second mobile device and operates in the dependent-operation mode when the start-up order is later than the start-up order of the second mobile device.

DETAILED DESCRIPTION OF THE INVENTION

Figure 1:
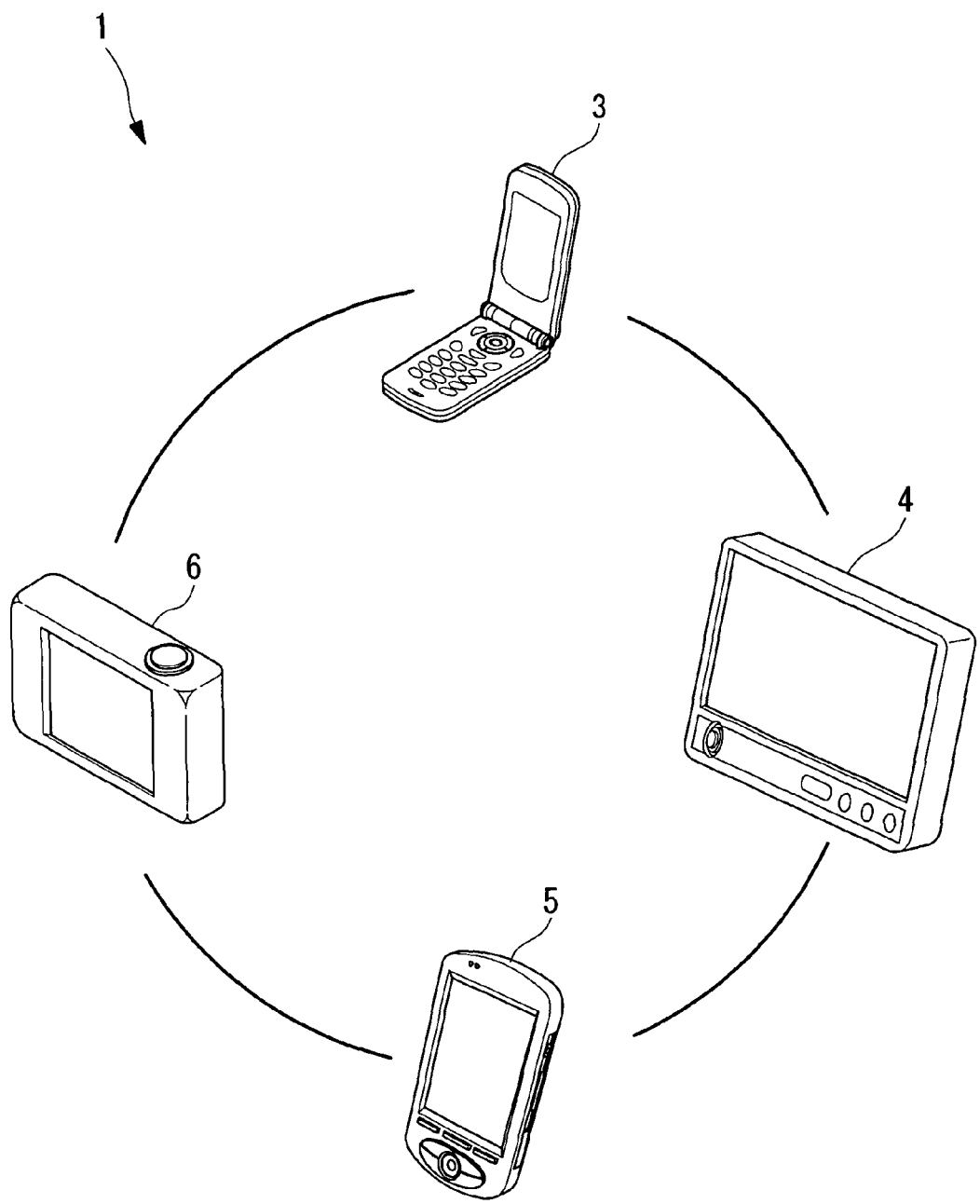
FIG. 1 illustrates the structure of a mobile device system.

The mobile device system according to the present invention includes a plurality of mobile devices, wherein each mobile device is operable in one of an independent-operation mode in which the mobile device operates with priority over the other mobile devices and a dependent mode in which the mobile device operates dependently on another mobile device and includes a start-up-order detection unit configured to detect the start-up order of the mobile device with respect to the other mobile devices, and wherein a first mobile device operates in the independent-operation mode when the start-up order of the first mobile device detected by the start-up-order detection unit is earlier than the start-up order of a second mobile device and operates in the dependent-operation mode when the start-up order is later than the start-up order of the second mobile device.

According to this structure, since each mobile device operates in the independent-operation mode or the dependent-operation according to the start-up order, a first mobile device that has been started up first operates in the independent-operation mode, and a second mobile device started up subsequently is operated in the dependent-operation mode. In this way, the mobile devices do not have to be individually configured at start-up, and both mobile devices can quickly interoperate.

Various types of mobile device, such as a mobile phone, a portable display device, and a digital camera, each have a specific function. The mobile phone has a key input unit that is easy to operate compared with the other mobile devices listed above; the portable display device has a large display device compared with other mobile devices; and the digital camera has an image-acquisition function. Thus, if a mechanism for sharing a function specific to a mobile device is provided, convenience can be greatly enhanced. With such a mobile device system, since a mobile device started up first and another mobile device started up subsequently can interoperate, the user can arbitrarily use the above-described functions in combination.

For example, when the user is using the digital camera and subsequently starts up the portable display device, it can be assumed that the user wants to view an image acquired by the digital camera on the portable display device. In such a case, with the above-described mobile device system, the image displayed on the digital camera is automatically displayed on the portable display device. Therefore, the user can view the image on a large screen without configuring the devices. Furthermore, for example, if the mobile device started up first is the portable display device and the mobile device subsequently started up is the mobile phone, the user can use the mobile phone for key input by interoperating the mobile phone and the portable display device and can easily carry out input operation for the portable display device.

In the above-described mobile device system, the mobile devices each may include a display unit, wherein when the start-up order detected by the start-up-order detection unit of the first mobile device is later than the start-up order of the second mobile device, the content displayed on the second mobile device may be displayed on the display unit of the first mobile device.

According to this structure, the content displayed on the display unit of a first mobile device operating in the independent-operation mode is also displayed on the display unit of a second mobile device operating in the dependent-operation mode. Therefore, the user can carry out an input operation while checking the information displayed on any of the mobile devices, and thus convenience is enhanced.

The content displayed on the display units of the second mobile devices operating in the above-described dependent-operation mode may be exactly the same as the content displayed on the display unit of the first mobile device or may be partially the same. Moreover, details linked to the content displayed on the display unit of the first mobile device operated in the independent-operation mode may be displayed on the display units of the second mobile devices.

The mobile device according to the present invention includes a start-up-order detection unit configured to detect the start-up order of the mobile device with respect to the other mobile devices, wherein each mobile device is operable in one of an independent-operation mode in which the mobile device operates with priority over the other mobile devices and a dependent mode in which the mobile device operates dependently on another mobile device, wherein a first mobile device operates in the independent-operation mode when the start-up order of the first mobile device detected by the start-up-order detection unit is earlier than the start-up order of a second mobile device and operates in the dependent-operation mode when the start-up order is later than the start-up order of the second mobile device.

According to this structure, when a first mobile device is started up before a second mobile device, the first mobile device operates in the independent-operation mode, and when the first mobile device is started up after the second mobile device, the first mobile device operates in the dependent-operation mode. Therefore, individual configuration operations for interoperability are not required, and the mobile devices can quickly interoperate.

The above-described mobile device may include a display unit, wherein when the start-up order detected by the start-up-order detection unit of the first mobile device is later than the start-up order of the second mobile device, the content displayed on the second mobile device is displayed on the display unit of the first mobile device.

According to this structure, when a first mobile device is operated in the dependent-operation mode, the content displayed on the display unit of a second mobile device operating in the independent-operation mode is displayed on the display unit of the first mobile, and thus convenience is enhanced.

The above-described mobile device system or mobile device is advantageous in that a plurality of mobile devices can interoperate without carrying out a configuration operation.

An embodiment of the mobile device system will be described below with reference to the drawings.

FIG. 1 illustrates an example of a mobile device system 1.

As shown in the drawing, the mobile device system 1 includes a plurality of mobile devices or, more specifically, a mobile phone 3, a portable display device 4, a personal digital assistant (PDA) 5, and a digital camera 6. These mobile devices are merely examples; any portable electronic devices may be used in any combination.

Figures 2, 3:
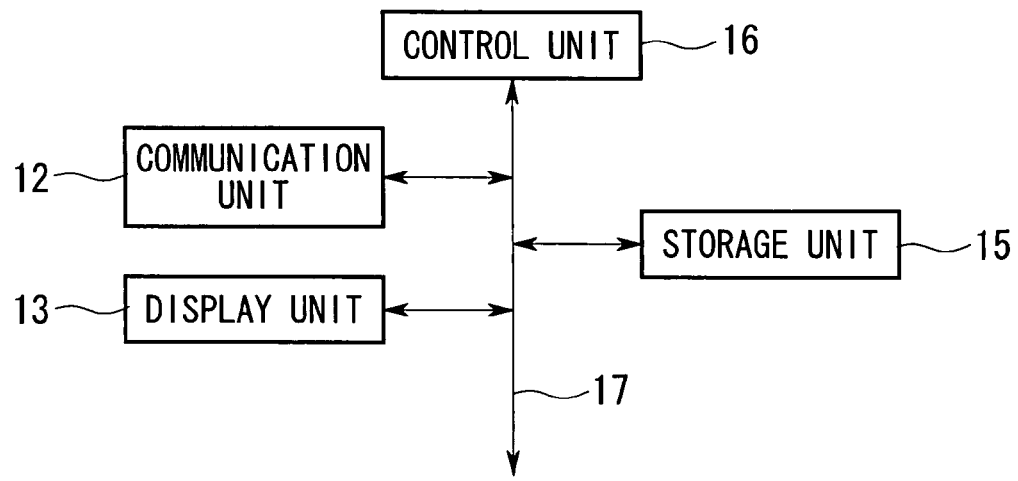
FIG. 2 illustrates the components common to mobile devices included in the mobile device system.
FIG. 3 illustrates an example of information stored in a storage unit of a mobile phone.

Each of the above-described mobile devices includes the following common components. More specifically, as illustrated in FIG. 2, each mobile device includes a communication unit (communication device) 12, a display unit (display device) 13, a storage unit 15, and a control unit 16. These units are mutually connected via a bus 17 and are capable of sending and receiving information between each other.

The components may be provided separately from components that are generally included in each mobile device, or the components that are generally included in each mobile device may be used as the above-described components. For example, since the mobile phone 3 generally includes a communication unit, a display unit, and an input unit, any of these units that are the same as the common components may preferably be shared. This also applies to the other mobile device.

The communication unit 12 is capable of carrying out wireless communication with the other mobile devices. For example, the communication unit 12 of the mobile phone 3 is capable of communicating with the portable display device 4, the PDA 5, and the digital camera 6.

The display unit 13 is, for example, a liquid crystal display.

The storage unit 15 holds information of the other mobile devices. More specifically, the storage unit 15 holds identification information of each mobile device. Various kinds of information, including the name of the device and information for enabling two-way communication, are linked to the identification information of each mobile device. The information for enabling two-way communication is, for example, an Internet protocol (IP) address of another device. For example, as shown in FIG. 3, identification information of the portable display device 4, PDA 5, and digital camera 6 is stored in the storage unit 15 of the mobile phone 3. The names and IP addresses are linked to the identification information of the mobile devices.

The control unit 16 performs overall control of the above-described units. The control unit 16 has two control modes: an independent-operation mode and a dependent-operation mode. The control unit 16 has a start-up-order detection function (start-up-order detection unit) for detecting the start-up order of the mobile device with respect to the start-up orders of other mobile devices and selectively sets the independent-operation mode and the dependent-operation mode according to the start-up order detected by this start-up-order detection function.

Figure 4:
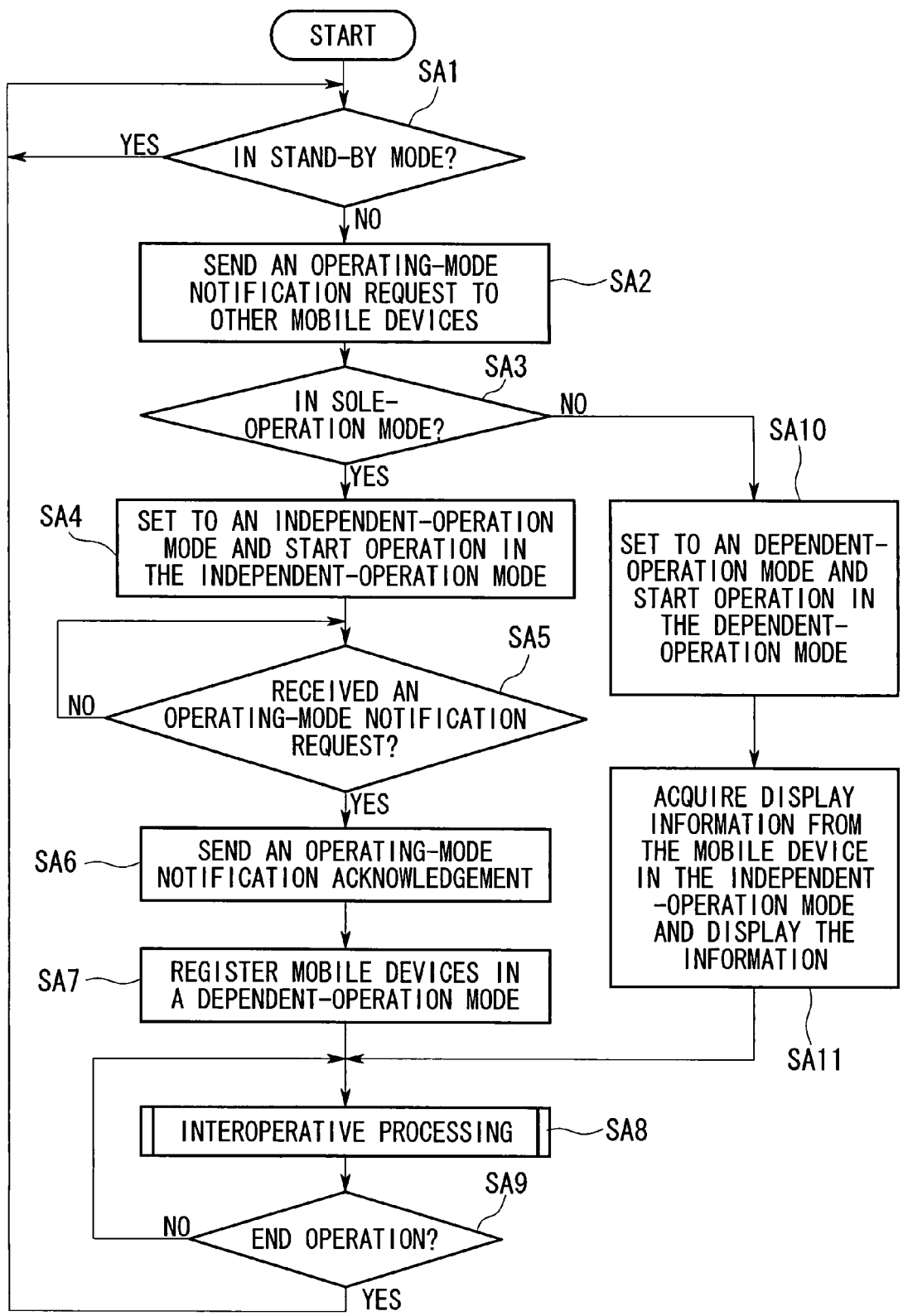
FIG. 4 is a flow chart illustrating the processing carried out by a control unit.

The control unit 16 of each mobile device having the above-described common structure carries out the process illustrated in FIG. 4. Although the process described below is executed in the control unit 16 of each mobile device, for simplification, the process carried out by the control unit 16 of the mobile phone 3 will be described as a representative example.

First, the control unit 16 of the mobile phone 3 determines whether or not the mobile phone 3 is in a stand-by mode (Step SA1 in FIG. 4). If the mobile phone 3 is in an operating mode, the communication unit 12 is operated to send an operating-mode notification request to another mobile device (Step SA2). As a result, the operating-mode notification request is received by the communication units 12 of the portable display device 4, the PDA 5, and the digital camera 6.

The control unit 16 of each mobile device that has received the operating-mode notification request sends an operating-mode notification acknowledgement, which indicates that the respective mobile device is in an operating mode, to the sender of the request, i.e., the mobile phone 3, if the respective mobile device is in an operating mode. On the other hand, if the respective mobile device is in a stand-by mode, an acknowledgement is not sent and the stand-by mode is maintained.

Next, the control unit 16 of the mobile phone 3 determines whether or not the mobile phone 3 is sole-operation mode on the basis of whether an operating-mode notification acknowledgement has been received from another mobile device (Step SA3). More specifically, the control unit 16 determines that the mobile phone 3 is not in a sole-operation mode when an operating-mode notification acknowledgement is received and determines that the mobile phone 3 is in a sole-operation mode when an acknowledgement is not received.

As a result, if the control unit 16 determines that the mobile phone 3 is in a sole-operation mode (YES in Step SA3), the control unit 16 sets the control mode to the independent-operation mode and starts operating in the independent-operation mode (Step SA4). In this way, the mobile phone 3 carries out normal processing in response to an input operation carried out by the user. In the independent-operation mode, when a second mobile device is started up by the user, the above-described Steps SA1 and SA2 are carried out also by this second mobile device, and an operating-mode notification request is sent to the other mobile device.

When the mobile phone 3 receives an operating-mode notification request (YES in Step SA5), an operating-mode notification acknowledgement is sent back to the mobile device that has sent the request (Step SA6). Then, information on the mobile device that has sent the request is stored in the storage unit 15 of the mobile phone 3 as a mobile device operating in the dependent-operation mode.

The above-described mobile device that has received the operating-mode notification acknowledgement from the mobile phone 3 determines that it is not sole-operation mode and selects the dependent-operation mode as the control mode. In this way, this mobile device functions as a device dependent on the mobile phone 3, which is operating in the independent-operation mode.

When there is a mobile device functioning dependently, the control unit 16 of the mobile phone 3 carries out interoperative processing until an operation termination command is input by the user (Step SA8). Then, when an operation termination command is input by the user, the mobile phone 3 enters the stand-by mode, and the process returns to Step SA1. The determination process of Step SA1 is repeated until the mobile phone 3 is started up again.

After Step SA8, another step may be provided for selecting whether to change the control mode of the mobile device that is already operating in the dependent-operation mode to the independent-operation mode.

If there is another mobile device that is already in operation when an operating-mode notification request is sent to the other mobile device in the above-described Step SA2, the mobile device in operation sends back an operating-mode notification acknowledgement.

In such a case, the control unit 16 of the mobile phone 3 determines that the mobile phone 3 is not in a sole-operation mode (NO in Step SA3) and sets the control mode to the dependent-operation mode (Step SA10). In this way, the mobile phone 3 operates dependent on the other mobile device that is operating in the independent-operation mode. More specifically, the control unit 16 of the mobile phone 3 acquires display data displayed on the display unit 13 of the mobile device operating in the independent-operation mode (Step SA11), displays this display information on the display unit 13 of the mobile phone 3, and then carries out the interoperative processing until the user inputs an operation termination command (Step SA8).

When an operation termination command is input by the user, the mobile phone 3 enters the stand-by mode, and the process returns to Step SA1. The determination process of Step SA1 is repeated until the mobile phone 3 enters an operating mode again.

Figure 5:
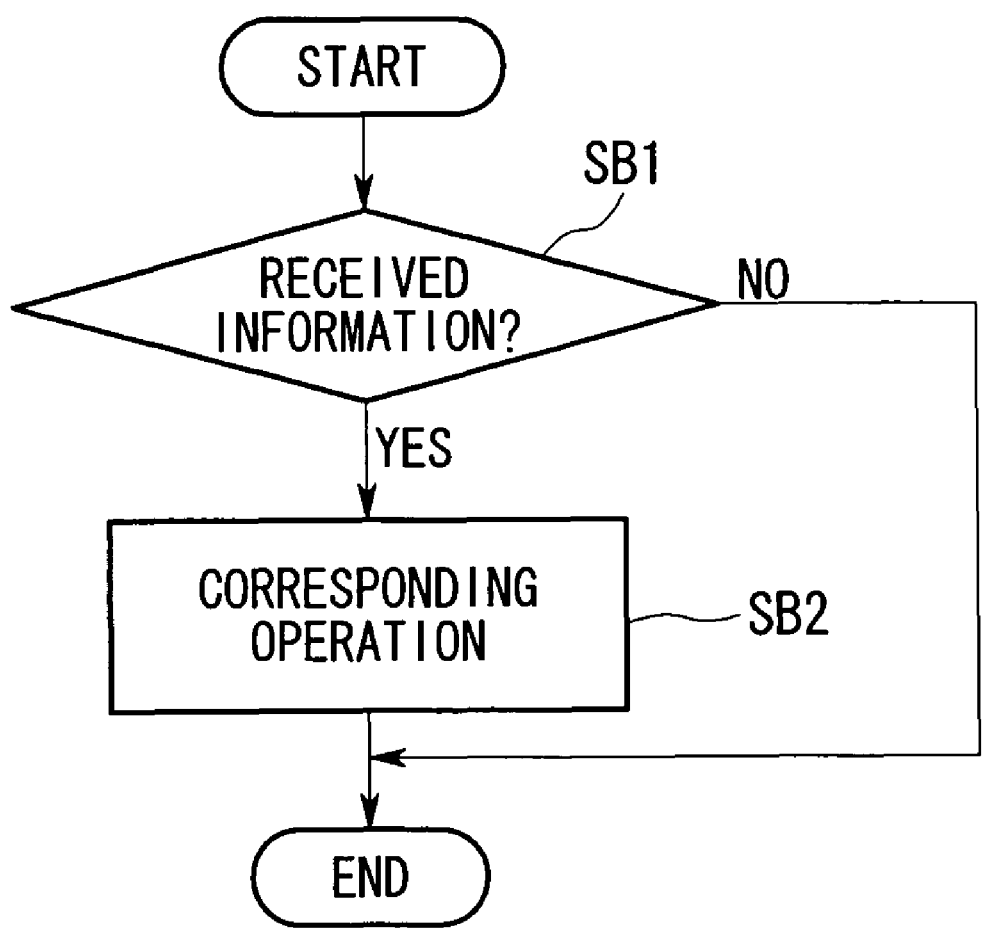
FIG. 5 is a flow chart illustrating interoperative processing.

Next, the interoperative processing carried out in Step SA8 in FIG. 4 will be described in detail with reference to FIG. 5. The interoperative processing is processing for controlling a mobile device that is operating in the independent-operation mode and a mobile device that is operating in the dependent-operation mode in such a way that they appear to be controlled by the same operating system (OS).

For example, when the user carries out an input operation with a mobile device operating in the dependent-operation mode, the content of the input operation is sent to the mobile device operating in the independent-operation mode. In this way, the content is received by the mobile device operating in the independent-operation mode (Step SB1), and the mobile device operating in the independent-operation mode carries out processing corresponding to the input operation (Step SB2).

In this way, each time the user carries out an input operation, the corresponding information is shared by a plurality of mobile devices that are in operation. Thus, the mobile devices can interoperate.

Figure 6:
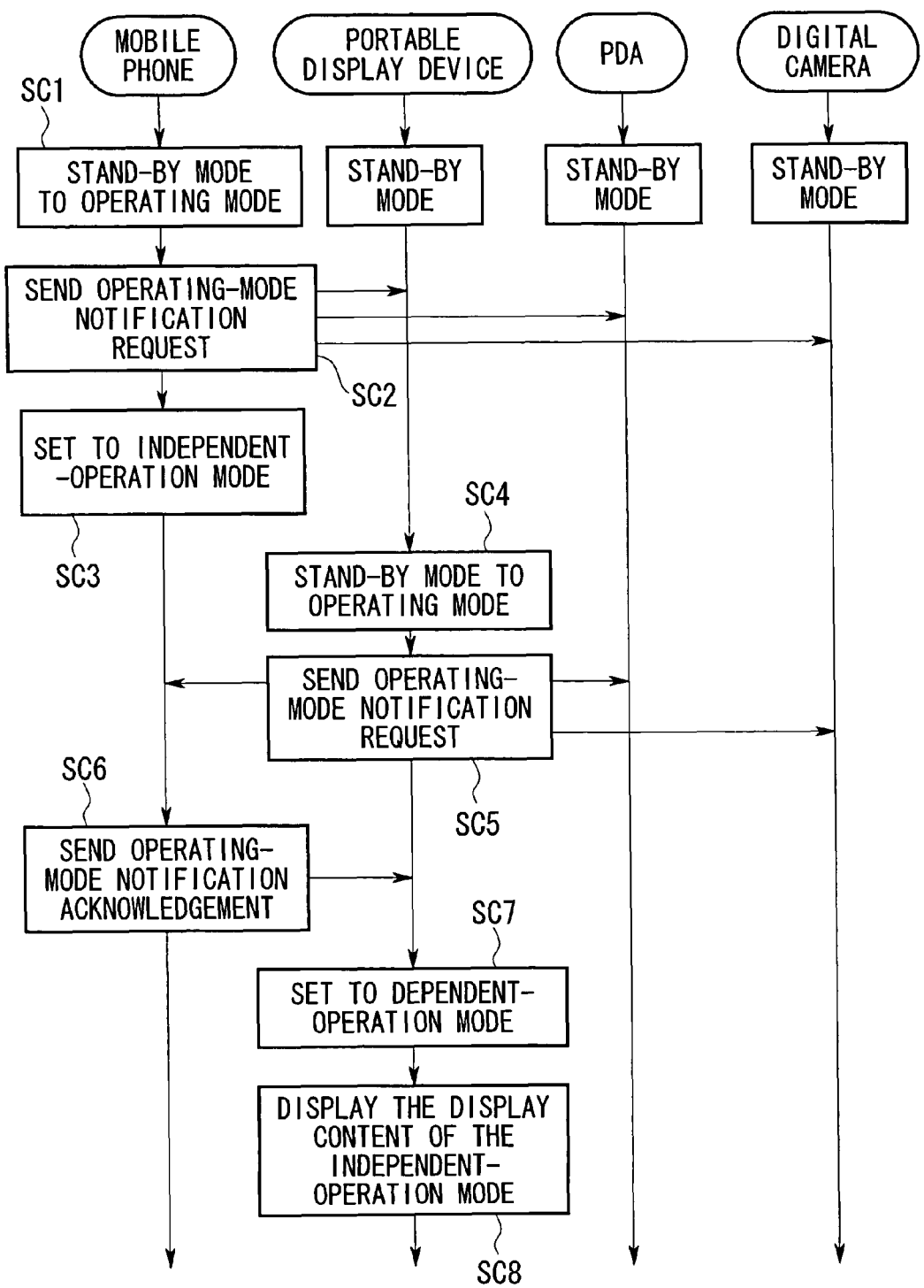
FIG. 6 is a timing chart briefly illustrating the operation of the mobile device system when processes illustrated in FIGS. 4 and 5 are executed in the control unit of the mobile devices.

Next, an operation of the mobile device system 1 resulting from the above-described processing being carried out by the control unit 16 of each mobile device will be briefly described with reference to FIG. 6.

Figure 7:
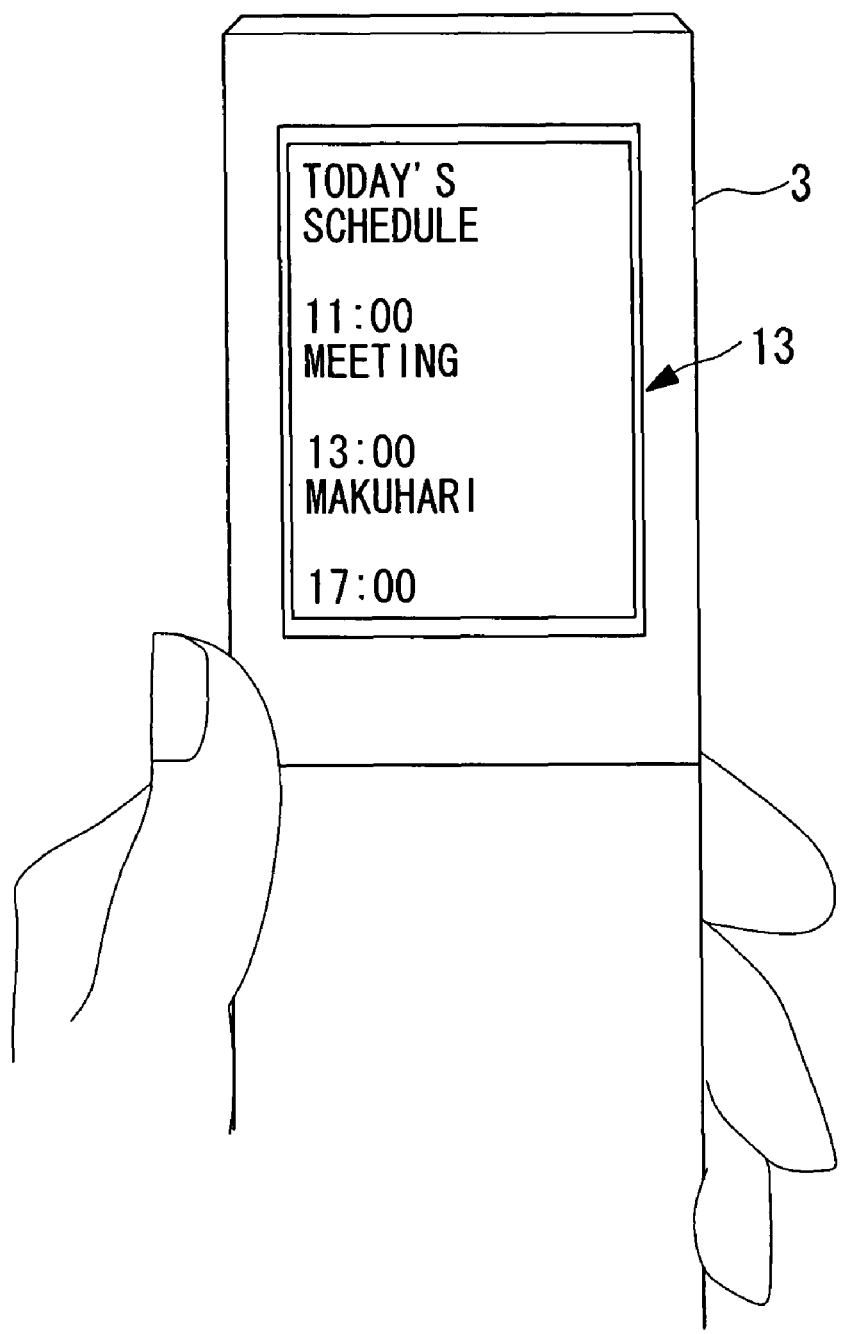
FIG. 7 illustrates an example display screen when a schedule function is called up on a mobile phone.

For example, if the mobile phone 3 is started up by the user, the control unit 16 of the mobile phone 3 detects that the mobile phone 3 has changed from the stand-by mode to the operating mode (Step SC1 in FIG. 6) and sends an operating-mode notification request to the other mobile device (Step SC2). Because the other mobile device is not in the operating mode, an operating-mode notification acknowledgement is not sent back. As a result, the control unit 16 determines that the mobile phone 3 is in a sole-operation mode and sets the control mode to the independent-operation mode (Step SC3). In this way, for example, if the schedule function is called up by key input carried out by the user, various processes, such as displaying a schedule screen on the display unit 13, are carried out. FIG. 7 illustrates an example display screen when the schedule function is called up on the mobile phone 3.

In this state, if the portable display device 4 is started up by the user (Step SC4), the control unit 16 of the portable display device 4 also carries out the process shown in FIG. 4, and an operating-mode notification request is sent to the other mobile device (Step SC5). Upon receiving the operating-mode notification request, the mobile phone 3 sends an operating-mode notification acknowledgement to the portable display device 4 (Step SC6).

Figure 8:
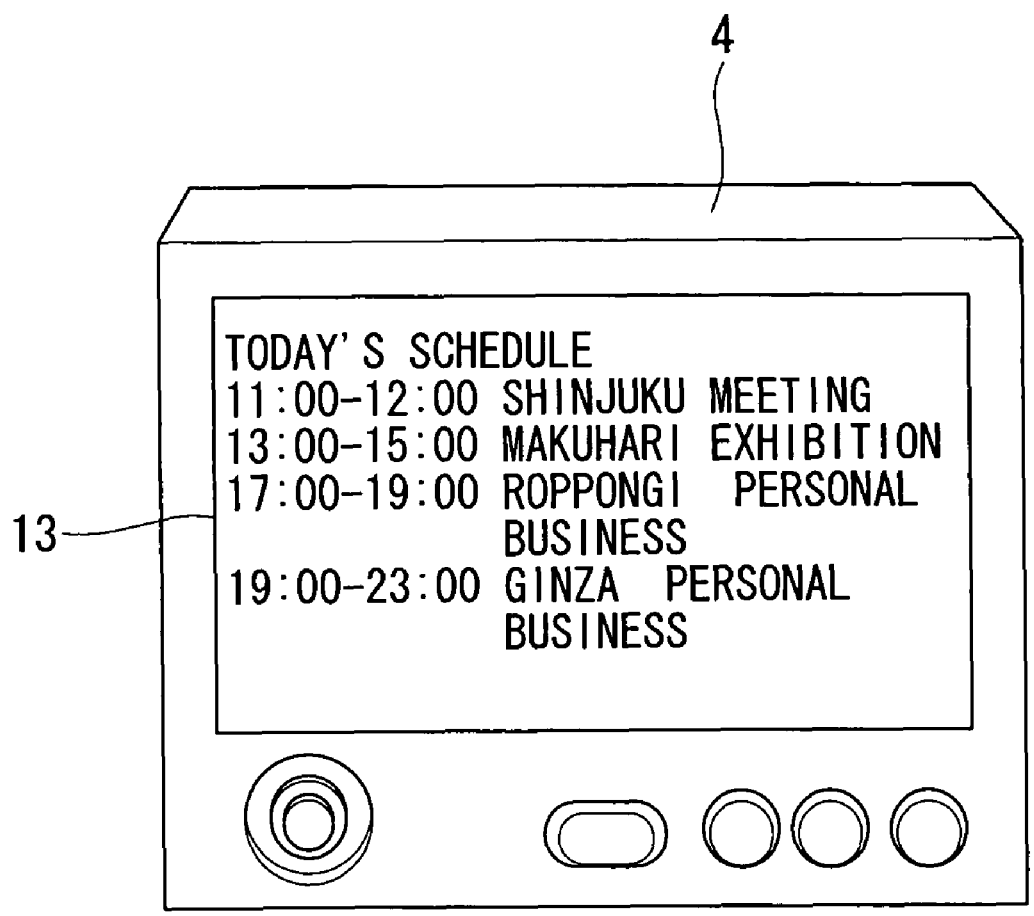
FIG. 8 illustrates an example display screen of a portable display device when a screen displays, in detail, content linked to the content displayed on the mobile phone illustrated in FIG. 7.

After receiving the operating-mode notification acknowledgement, the portable display device 4 determines that it is not solely operating and sets the control mode to the dependent-operation mode (Step SC7). In this way, the display unit 13 of the portable display device 4 displays the information displayed on the display unit 13 of the mobile phone 3. FIG. 8 shows an example display screen of the portable display device 4 when a screen displays details linked to the content displayed on the mobile phone 3 as shown in FIG. 7.

Subsequently, since the mobile phone 3 and the portable display device 4 carry out the interoperative processing shown in FIG. 5, the mobile phone 3 and the portable display device 4 share the input operation information and interoperate.

As described above, in the mobile device system 1 having the above-described structure, various types of mobile device, such as the mobile phone 3, operate in the independent-operation mode or the dependent-operation mode, depending on the start-up order. Therefore, the mobile device that is started up first operates in the independent-operation mode, and another mobile device started up subsequently operates in the dependent-operation mode. In this way, the mobile devices do not have to be individually configured at start-up, and both mobile devices can be quickly interoperate.

Furthermore, in the mobile device system 1 having the above-described structure, the content displayed on the display unit 13 of the mobile device operating in the independent-operation mode is also displayed on the display units 13 of the mobile devices operating in the dependent-operation mode. Therefore, the user can carry out an input operation while checking the information displayed on any of the mobile devices, thus enhancing convenience.

The content displayed on the display units 13 of other mobile devices operating in the dependent-operation mode may be exactly the same as the content displayed on the display unit 13 of the mobile device operating in the independent-operation mode, or it may be partially the same. Moreover, details linked to the content displayed on the display unit 13 of the mobile device operating in the independent-operation mode may be displayed on the display units 13 of the other mobile devices operating in the dependent-operation mode.

More specifically, so long as the displayed content originates from the same data, the portion of the data to be displayed on each mobile device may be arbitrarily changed on the basis of the size of the display units 13. For example, since the display unit 13 of the portable display device 4 is larger than the display unit 13 of the mobile phone 3, more information can be displayed on the display unit 13 of the portable display device 4 compared to that displayed on the display unit 13 of the mobile phone 3. In such a case, as shown in FIGS. 7 and 8, summarized information may be displayed on the display unit 13 of the mobile phone 3 and detailed information may be displayed on the display unit 13 of the portable display device 4.

According to this embodiment, a case in which two mobile devices are started up is described. However, a plurality of mobile devices may operate in the dependent-operation mode. Furthermore, when the mobile device operating in the independent-operation mode receives an operating-mode notification request from a mobile device in operation, information indicating that the mobile device operating in the independent-operation mode is operating in the independent-operation mode may be sent together with an operating-mode notification acknowledgement. In this way, if a plurality of mobile devices are already in operation, a mobile device that is subsequently started up can recognize the mobile device operating in the independent-operation mode.

Embodiments of the mobile device system and mobile devices have been described above in detail with reference to the drawings. However, specific structures are not limited to those described in the embodiments, and modifications may be made so long as they do not depart from the spirit of the invention.

What is claimed is:

1. A mobile device system comprising:
a plurality of mobile devices,
wherein each mobile device is operable in one of an independent-operation mode in which the mobile device operates with priority over the other mobile devices and a dependent mode in which the mobile device operates dependently on another mobile device and includes a start-up-order detection unit configured to detect the start-up order of the mobile device with respect to the other mobile devices,
wherein a first mobile device operates in the independent-operation mode when the start-up order of the first mobile device detected by the start-up-order detection unit is earlier than the start-up order of a second mobile device and operates in the dependent-operation mode when the start-up order is later than the start-up order of the second mobile device, and
wherein when an input operation is carried out with the first mobile device operating in the dependent-operation mode, a content of the input operation is sent to the second mobile device operating in the independent-operation mode, and the second mobile device operating in the independent-operation mode carries out processing corresponding to the input operation.

2. The mobile device system according to claim 1,
wherein the mobile devices each include a display unit, and
wherein when the start-up order detected by the start-up-order detection unit of the first mobile device is later than the start-up order of the second mobile device, the content displayed on the second mobile device is displayed on the display unit of the first mobile device.

3. A mobile device comprising:
a start-up-order detection unit configured to detect the start-up order of the mobile device with respect to other mobile devices, wherein each mobile device is operable in one of an independent-operation mode in which the mobile device operates with priority over the other mobile devices and a dependent mode in which the mobile device operates dependently on another mobile device,
wherein a first mobile device operates in the independent-operation mode when the start-up order of the first mobile device detected by the start-up-order detection unit is earlier than the start-up order of a second mobile device and operates in the dependent-operation mode when the start-up order is later than the start-up order of the second mobile device, and
wherein when an input operation is carried out with the first mobile device operating in the dependent-operation mode, a content of the input operation is sent to the second mobile device operating in the independent-operation mode, and the second mobile device operating in the independent-operation mode carries out processing corresponding to the input operation.

4. The mobile device according to claim 3, further comprising:
a display unit,
wherein when the start-up order detected by the start-up-order detection unit of the first mobile device is later than the start-up order of the second mobile device, the content displayed on the second mobile device is displayed on the display unit of the first mobile device.

* * * * *